(12) United States Patent
Osaku et al.

(10) Patent No.: US 7,647,767 B2
(45) Date of Patent: Jan. 19, 2010

(54) EXHAUST GAS PURIFYING APPARATUS IN ENGINE

(75) Inventors: Yasushi Osaku, Ageo (JP); Toshio Kondou, Ageo (JP); Kiyoshi Fukuda, Ageo (JP)

(73) Assignee: Nissan Diesel Motor Co., Ltd., Ageo-shi (JP)

( * ) Notice: Subject to any disclaimer, the term of this patent is extended or adjusted under 35 U.S.C. 154(b) by 181 days.

(21) Appl. No.: 10/570,316

(22) PCT Filed: Sep. 6, 2004

(86) PCT No.: PCT/JP2004/012940

§ 371 (c)(1),
(2), (4) Date: Nov. 17, 2006

(87) PCT Pub. No.: WO2005/024194

PCT Pub. Date: Mar. 17, 2005

(65) Prior Publication Data

US 2007/0079599 A1    Apr. 12, 2007

(30) Foreign Application Priority Data

Sep. 5, 2003   (JP) ............................ 2003-314436

(51) Int. Cl.
*F01N 3/10* (2006.01)

(52) U.S. Cl. .......................................... 60/286; 60/301
(58) Field of Classification Search ................ 60/286, 60/295, 298, 301, 303; 220/4.14, 560.11, 220/562–564; 165/119, 163; 123/557
See application file for complete search history.

(56) References Cited

U.S. PATENT DOCUMENTS 4,350,134 A * 9/1982 Sparks ........................ 123/557

(Continued)

FOREIGN PATENT DOCUMENTS

DE        198 41 770 A1    4/2000

(Continued)

OTHER PUBLICATIONS

International Preliminary Report and Written Opinion; and an English-language translation of the International Preliminary Report and Written Opinion.

*Primary Examiner*—Thomas E Denion
*Assistant Examiner*—Jonathan Matthias
(74) *Attorney, Agent, or Firm*—McDermott Will & Emery LLP

(57) ABSTRACT

Subject To enable an appropriate operation of an exhaust gas purifying apparatus which uses urea or the like as a reducing agent, and further, to enable the stable concentration detection and the stable supply of the reducing agent during the cold months and also to prevent the generation of ammonia series gas during the severe hot months.
Means for solving the Subject An exhaust gas purifying apparatus in an engine 1 is for supplying the urea water in a storage tank 20 to a reduction catalyst 3 disposed in an exhaust system. In this exhaust gas purifying apparatus, a concentration detecting device 60 is disposed in the storage tank 20, and the detected concentration of the urea water is adopted as basic information for the supply control of the reducing agent. Further, a heating device heating the reducing agent in the storage tank 20 and a cooling device cooling this reducing agent are disposed, to heat, preferably, the reducing agent in the vicinity of a detecting section 61 of the concentration detecting device 60 and the reducing agent in the vicinity of an inlet port 12 of a supply pipe 12.

13 Claims, 7 Drawing Sheets

U.S. PATENT DOCUMENTS

| | | | |
|---|---|---|---|
| 4,865,005 A * | 9/1989 | Griffith | 123/546 |
| 6,063,350 A * | 5/2000 | Tarabulski et al. | 423/239.1 |
| 6,266,955 B1 * | 7/2001 | Liang et al. | 60/274 |
| 6,293,420 B1 * | 9/2001 | Richter et al. | 220/563 |
| 6,387,336 B2 * | 5/2002 | Marko et al. | 423/212 |
| 6,436,359 B1 * | 8/2002 | Spencer et al. | 423/235 |
| 6,837,041 B2 * | 1/2005 | Hernier | 60/286 |
| 2004/0031263 A1 * | 2/2004 | Binder et al. | 60/286 |

FOREIGN PATENT DOCUMENTS

| | | |
|---|---|---|
| DE | 199 35 920 A1 | 3/2001 |
| DE | 19935920 A1 * | 3/2001 |
| DE | 10156714 A1 | 6/2002 |
| DE | 202 19 608 U1 | 6/2003 |
| JP | 2000-027627 | 1/2000 |
| JP | 2002-155732 | 5/2002 |
| JP | 2002-155732 A | 5/2002 |
| JP | 2002-527660 | 8/2002 |
| WO | WO 00-21881 A1 | 4/2000 |
| WO | WO 00/21881 A1 | 4/2000 |
| WO | WO 00/75643 | 12/2000 |
| WO | WO 00-75643 A1 | 12/2000 |

* cited by examiner

EXHAUST GAS PURIFYING APPARATUS IN ENGINE

This is a continuation of PCT/JP2004/012940, filed on Sep. 6, 2004.

FIELD OF THE INVENTION

The present invention relates to an exhaust gas purifying apparatus in an engine. In details, in an exhaust gas purifying apparatus for purifying nitrogen oxides (to be referred to as "$NO_x$" hereunder) emitted from an on-vehicle diesel engine, a gasoline engine and the like, by using ammonia or precursor thereof as a reducing agent, the present invention relates to a technology for improving in particular a supply system of the reducing agent to achieve the maintenance and adjustment of a function inherent in this exhaust gas purifying apparatus.

DESCRIPTION OF THE RELATED ART

There has been proposed the following exhaust gas purifying apparatus as the one for purifying especially $NO_x$ from among harmful components emitted from an engine.

This apparatus comprises a reduction catalyst disposed on an exhaust passage of the engine, and is for supplying the reducing agent to the upstream of this reduction catalyst to perform the reaction of $NO_x$ in the exhaust gas with the reducing agent, thereby making $NO_x$ to be harmless. The reducing agent to be supplied is stored in a storage tank at the ordinary temperature and in a liquid state, and the reducing agent of necessary amount is injected by an injection nozzle. As the reducing agent, it is typical to use urea which readily generates ammonia having the good reactivity with $NO_x$, by the hydrolysis or the like. In the storage tank, the aqueous ammonia solution or the other aqueous reducing agent solution may be stored, other than this aqueous urea solution. In view of the possibility of the aqueous reducing agent solution freezing during the cold months, heating wires are disposed for heating the entire or a main part of each of the storage tank and a supply piping system for the reducing agent.

Patent Literature 1:
Japanese Unexamined Patent Publication No. 2000-027627

DISCLOSURE OF THE INVENTION

Problems to be solved by the Invention

However, the above described exhaust gas purifying apparatus has a problem as described in the following. In this apparatus, when the concentration of the reducing agent contained in the aqueous reducing agent solution is changed, if a driver continues to operate the engine without being aware of this change, there is a possibility that ammonia loadings to the exhaust gas is deviated from an appropriate value, and therefore, the desired $NO_x$ purification rate cannot be achieved. In particular, although the mixing rate (namely, the concentration) of the reducing agent and the water is inappropriate, or there occurs the mixing of different type of aqueous solution, the lack of the reducing agent residual amount or the like, if the engine is consecutively operated, there is a possibility of the discharge of large amount of $NO_x$.

Further, in the case where the aqueous reducing agent solution whose freezing point is lower than that of the water, such as the aqueous urea solution or the like, is used, during the cold months, the freezing of the water which reached the freezing point earlier than the aqueous reducing agent solution occurs at an early time. Therefore, the freezing of the water begins in the vicinity of a wall surface of the storage tank, namely, from the outside of the urea water in the storage tank, so that the urea water is concentrated at the center part of the storage tank, and thus, the concentration of the urea water to be taken into the supply piping system is gradually increased. If the engine is consecutively operated in spite of this concentration increase, there is a possibility that not only the NOx purification rate is lowered, but also excessively generated ammonia passes through the reduction catalyst to be discharged into the atmosphere.

In the above described exhaust gas purifying apparatus, as countermeasures to the cold months, the storage tank and supply piping system for the reducing agent are heated, to prevent the aqueous reducing agent solution from being frozen. However, when the water is once frozen, since the driver cannot be aware of the concentration change in the reducing agent, it is impossible to avoid the above disadvantage.

On the other hand, during the severe hot months, there is the case where the heat is radiated from the engine and the muffler, in addition to the heat radiation from the road surface and the like, and therefore, the reducing agent in the storage tank is exposed to the high temperature equal to or higher than the predetermined temperature. In such a case, there is a possibility that the ammonia series gas of minute amount is generated from the aqueous reducing agent solution in the storage tank or in the supply piping system.

The present invention has an object to dispose a concentration detecting device for detecting the concentration of a reducing agent stored in a storage tank, so that the proper processing is performed using the concentration detected by the concentration detecting device as basic information, to enable an appropriate operation of an exhaust gas purifying apparatus.

The present invention has a further object to dispose, as countermeasures to the cold months, a device for heating the reducing agent in the storage tank or in a supply piping system, to enable the stable supply of the reducing agent and the stable detection of the concentration by the concentration detecting device.

The present invention has a furthermore object to dispose, as countermeasures to the severe hot months, a device for cooling the storage tank or supply piping system for the reducing agent, to prevent the generation of ammonia in the storage tank or in the supply piping system.

Means for solving the Problems

The present invention provides an exhaust gas purifying apparatus in an engine.

In one embodiment of the present invention, a reduction catalyst for accelerating the reduction of nitrogen oxides is disposed on an exhaust passage of the engine, and a reducing agent for reducing nitrogen oxides in the exhaust gas is supplied from a storage tank to the upstream of the reduction catalyst. In the storage tank, a device for detecting the concentration of this reducing agent is disposed, and also a device for heating the reducing agent in the storage tank is disposed.

In another embodiment of the present invention, a reduction catalyst for accelerating the reduction of nitrogen oxides is disposed on an exhaust passage of the engine, and a reducing agent for reducing nitrogen oxides in the exhaust gas is supplied from a storage tank to the upstream of the reduction catalyst. In the storage tank, a device for detecting the concentration of this reducing agent is disposed, and also a device for cooling the reducing agent in the storage tank is disposed.

Effects of the Invention

According to one embodiment of the present invention, the concentration of the reducing agent detected by the concentration detecting device is adopted as basic information, and it is judged based on this basic information whether or not the exhaust emission purifying apparatus is appropriately operated. When the exhaust emission purifying apparatus is not appropriately operated, the necessary processing is performed so that the discharge of $NO_x$ can be suppressed. Further, during the cold months, the reducing agent in the storage tank is heated by a heating device to prevent the freezing of the reducing agent. As a result, it becomes possible to stably supply the reducing agent, and also, to stably detect the concentration of the reducing agent by the concentration detecting device. Even in the case where the water in the vicinity of a wall surface of the storage tank is frozen, and therefore, the concentration of the reducing agent rises at the center part of the tank, it is possible to be aware of such a change in the concentration by the concentration detecting device, thereby enabling the maintenance of an appropriate operation of the exhaust emission purifying apparatus.

Further, according to another embodiment of the present invention, the maintenance of the appropriate function of the exhaust emission purifying apparatus can be achieved based on the concentration information, and also, during the severe hot months, in the case where the storage tank is heated by the radiation heat from the road surface and the exhaust heat of the engine, it is possible to cool the reducing agent in the storage tank by the cooling device, thereby enabling the prevention of the generation of ammonia series gas. Even in the case where the concentration is lowered due to the generation of ammonia series gas, it is possible to cope with this change by the concentration detecting device.

The other objects and features of the invention will become understood from the following description with reference to the accompanying drawings.

The entire contents of Japanese Patent Application No. 2003-314436, a priority of which is claimed, are incorporated as a part of the present application herein by reference.

NUMERAL EXPLANATION

1 . . . diesel engine, 3 . . . reduction catalyst, 10 . . . reducing agent supply device, 13 . . . supply piping, 14 . . . return piping, 20 . . . storage tank, 30 . . . cooling water circulating passage, 40 . . . heat exchanging device, 41, 41a, 41b . . . heat exchanger pipe, 50 . . . cooling water circulating passage, 51 . . . heat radiating device, 60 . . . concentration detecting device, 61 . . . detecting section of concentration detecting device, 70 . . . protector, 81, 82 . . . foam heat insulating member

BEST MODES FOR CARRYING OUT THE INVENTION

Figure 1:
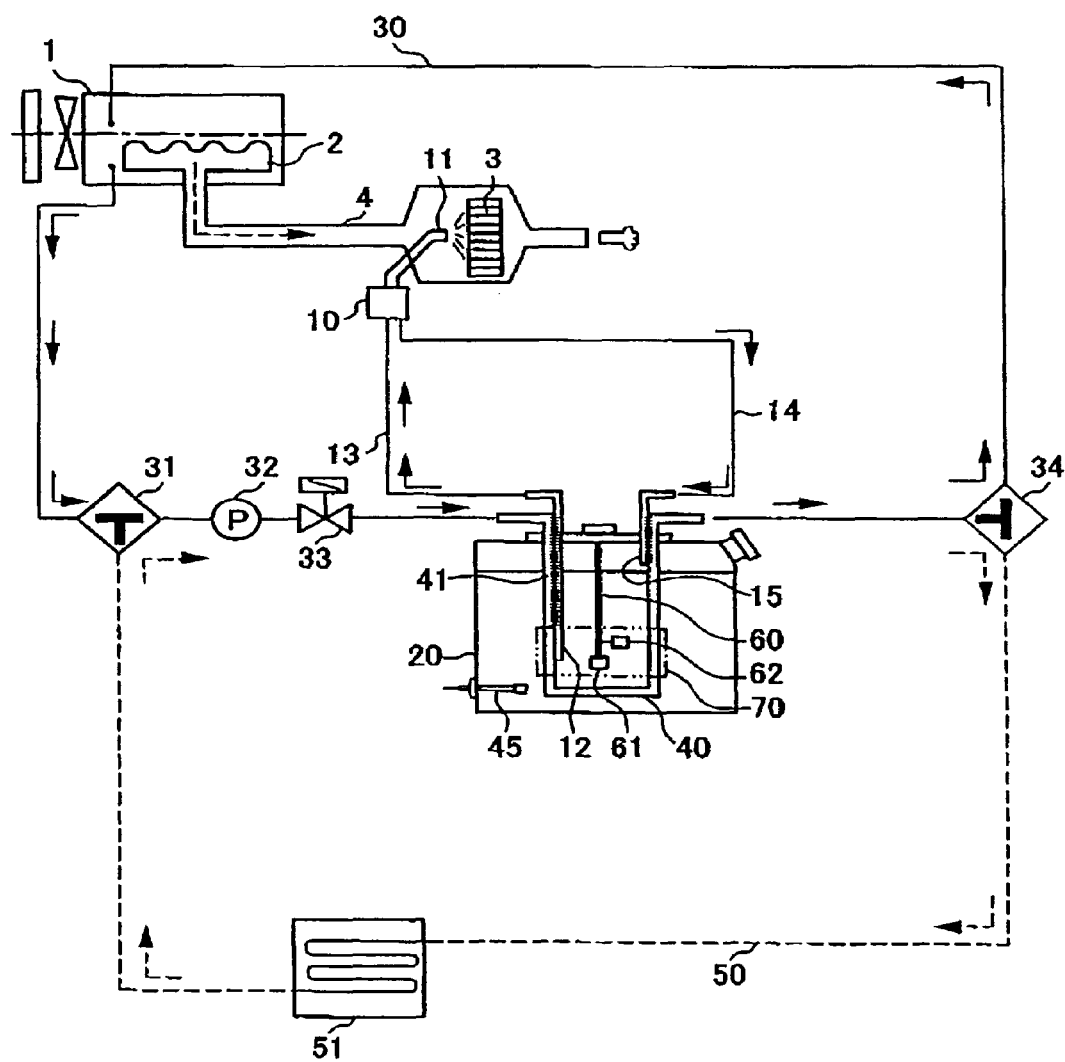
FIG. 1 is a diagram showing a configuration of an exhaust gas purifying apparatus according to one embodiment of the present invention.

FIG. 1 shows a configuration of an exhaust gas purifying apparatus in an engine 1 according to one embodiment of the present invention.

The engine 1 is a diesel engine mounted on a vehicle. The exhaust gas from the engine 1 passes from an exhaust manifold 2 through an exhaust pipe 4 to which a reduction catalyst 3 for $NO_x$ is disposed, to be emitted into the atmosphere. To be specific, three catalysts, namely, an oxidation catalyst for nitrogen monoxide (to be referred to as "NO" hereunder), the reduction catalyst 3 for $NO_x$ and an oxidation catalyst for ammonia, are disposed in the exhaust pipe 4, in this order from the upstream side. An exhaust system of the engine 1 comprises the exhaust pipe 4, these three catalysts, temperature sensors arranged on the front and rear of the reduction catalyst 3, a $NO_x$ sensor and the like, which are not specifically shown in the figure. The $NO_x$ sensor is for detecting the concentration of $NO_x$ contained in the exhaust gas after subjected to the reduction processing. The oxidation catalytic converter for NO is for oxidizing hydrocarbon in the exhaust gas, and also for converting NO in the exhaust gas into $NO_x$ mainly consisting of nitrogen dioxide (to be referred to as "$NO_2$" hereunder), and operates to adjust a ratio between NO and $NO_2$ contained in the exhaust gas to a ratio optimum for the reduction processing of $NO_x$ by the reduction catalyst 3. The oxidation catalyst for ammonia is for purifying slip ammonia passed through the reduction catalyst 3 without contributing to the reduction processing of $NO_x$ on the reduction catalyst 3.

To the reduction catalyst 3 for $NO_x$, a reducing agent is supplied by a reducing agent supply device 10 (to be simply referred to as "supply device" hereunder). In the present embodiment, urea is adopted as the reducing agent, and solid urea or powdery urea in an aqueous solution state is stored in a storage tank 20. The urea water stored in the storage tank 20 is injected by an injection nozzle 11 disposed on the upstream side of the reduction catalyst 3, to be supplied into the exhaust pipe 4. The supply device 10 and the injection nozzle 11 constitute an injecting device of air-assist type. The urea water in the storage tank 20 is led into the supply device 10 via a supply pipe 13, to be injected together with the air from the injection nozzle 11. Other than the aqueous urea solution, the aqueous ammonia solution or the like may be adopted as the aqueous reducing agent solution. The injected urea water is hydrolyzed by the exhaust heat in the exhaust pipe 4, to generate ammonia. Generated ammonia reacts with $NO_x$ in the exhaust gas on the reduction catalyst 3 for $NO_x$, to purify $NO_x$ into the water and the harmless gas. Note, the supply pipe 13 corresponds to "a supply pipe" in the present invention.

The urea water is sucked via an inlet port 12 of the supply pipe 13, which is positioned in the vicinity of the center of the bottom portion of the storage tank 20, to be supplied via the supply pipe 13 to the supply device 10 and then to the injection nozzle 11. Further, the supply device 10 is connected to the storage tank 20 via a return pipe 14, and therefore, the excessive urea water is returned to the storage tank 20 via the return pipe 14. The return pipe 14 is opened at the upper center portion in the storage tank 20.

The storage tank 20 is arranged on a first circulation passage 30, and this first circulation passage 30 is formed by "first piping" as a parallel passage branched from a cooling water circulation passage (not shown in the figure) of the engine 1. On the first circulation passage 30, a first three-way valve 31, a pump 32, an electromagnetic valve 33, a heat exchanging device 40 and a second three-way valve 34 are disposed in this order. The heat exchanging device 40 is for performing the heat exchange between the cooling water of the engine 1 and the urea water in the storage tank 20, and comprises a heat exchanger pipe 41 serving as "a pipe member" in the present invention. The heat exchanger pipe 41 is formed in an approximate U-shape, and a folded portion of U-shape is arranged in the vicinity of the bottom portion of the storage tank 20. In the case where the first three-way valve 31, the second three-way valve 32 and the electromagnetic valve 33 are changed over, to open the first circulation passage 30, the first circulation passage 30 functions as a heating device for circulating the cooling water of the engine 1 which serves as a heat career obtained from the engine 1, to heat the urea water in the storage tank 20 via the heat exchanger pipe 41.

Further, to the first and second three-way valves 31 and 34 on opposite sides of the storage tank 20, a second circulation passage 50 is connected, and the second circulation passage 50 is formed from "second piping" as a parallel passage to the first circulation passage 30. On the second circulation passage 50, a heat radiating device 51 for heat radiating the circulating cooling water of the engine 1 is disposed. In the case where the first three-way valve 31, the second three-way valve 34 and the electromagnetic valve 33 are changed over, to open the second circulation passage 50, the second circulation passage 50 and a part of the first circulation passage 30 function as a cooling device for circulating the cooling water which was heat radiated and cooled by the heat radiating device 51, to cool the urea water in the storage tank 20 via the heat exchanger pipe 41.

Figure 2:
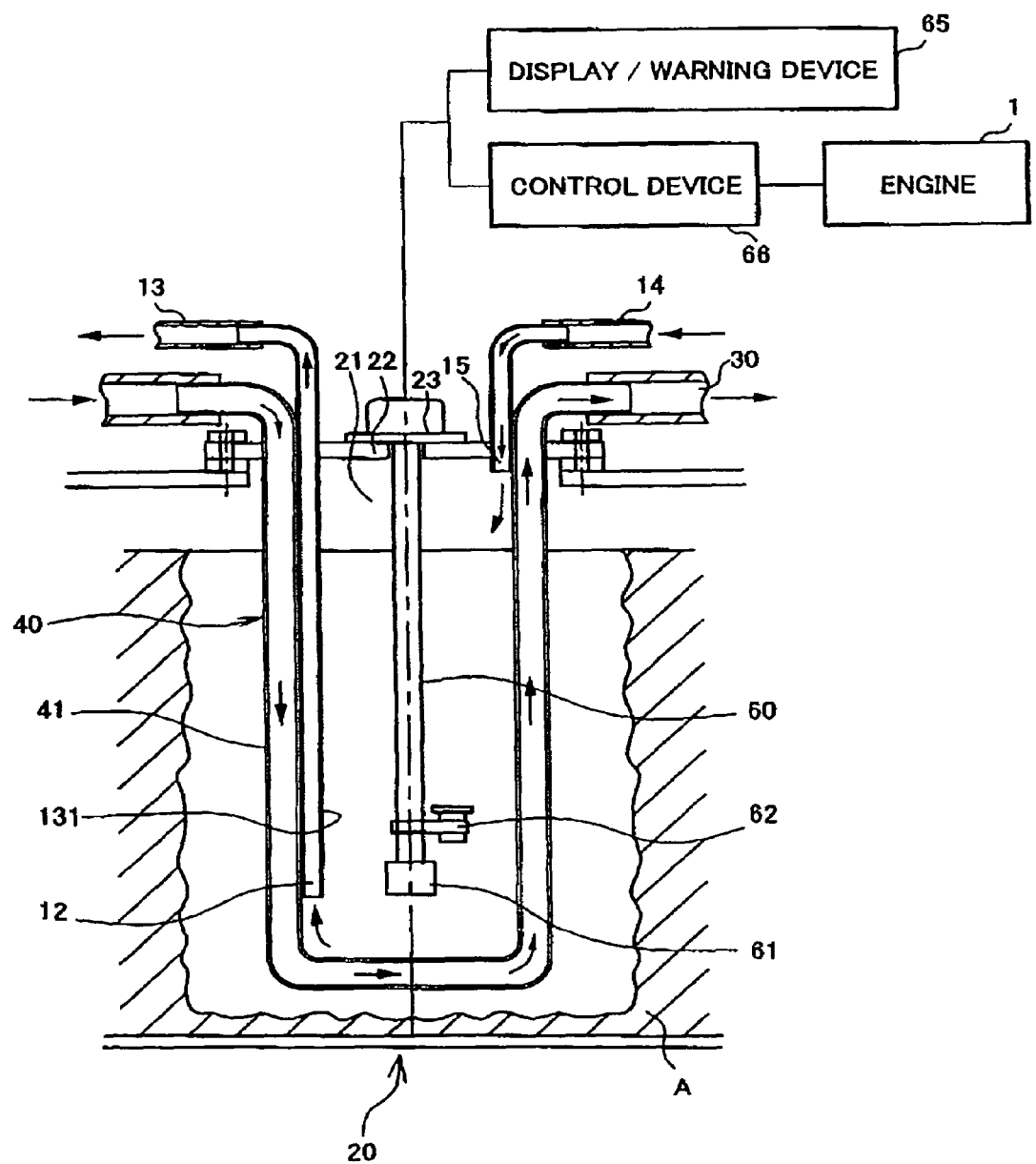
FIG. 2 is a diagram showing a main part of a reducing agent storage tank disposed in the exhaust gas purifying apparatus shown in FIG. 1.

FIG. 2 shows a configuration of the inside of the storage tank 20 in detail.

With a fitting opening 21 disposed on a lid portion of the storage tank 20, a cap 22 is detachably fitted by means of a bolt and a nut, and to this cap 22, a concentration detecting device 60 for the urea water is attached. The concentration detecting device 60 is fixed to the cap 22 by means of a flange 23, and a detecting section 61 of the concentration detecting device 60 is hanged from the cap 22 into the storage tank 20. The detecting section 61 is arranged above the center of the bottom portion of the storage tank 20, and detects the concentration of the urea water based on a difference between the temperatures detected by the following two temperature sensors (not shown in the figure) incorporated therein. The detecting section 61 incorporates therein a heater and the temperature sensors disposed on different two points, and one of the temperature sensors is arranged on the heater or in the vicinity of the heater. The heater is driven and detection values by the two temperature sensors are compared with each other, so that the urea water concentration around the heater can be detected. Consequently, according to the concentration detecting device 60, it is possible to detect not only the concentration of the urea water, but also the types of liquid (light oil, kerosene, water or the like) filled in the storage tank 20 in place of the reducing agent, the difference between the air and the liquid, the lack of the urea water, the residual amount of the urea water or the like. As a practical example of the concentration detecting device, there is known a concentration detecting device manufactured and distributed by Mitsui Mining and Smelting Co., Ltd. A detection value from the concentration detecting device 60 is input to a display or warning apparatus 65, and also to a control device 66 constructed as a computer. To the control device 66, various operating conditions of the engine 1 are also input.

The concentration of the urea water in the storage tank 20 can be detected based on the detection value from the concentration detecting device 60, so that the concentration of the urea water supplied into the exhaust pipe 4 can be always grasped. Therefore, it is possible to perform the necessary processing to a change in the concentration of the stored urea water based on basic information, that is, the concentration of the urea water, to suppress the discharge of $NO_x$. This processing can be similarly performed in the case where the urea water is frozen from the vicinity of a wall surface of the storage tank 20 during the cold month, and thus, the concentration of the stored urea water is changed.

To be specific, in the case where the unusual concentration of the urea water is detected, the water or the urea water is manually refilled after an operation of the engine 1 is stopped or is automatically refilled during the operation of the engine 1, or the urea water of appropriate concentration is filled in the storage tank 20 in place of the urea water of unusual concentration, so that the concentration of the urea water is maintained at an appropriate value. Further, the supply device 10 is driven by the control device 66 to control a supply amount of the urea water, based on the detected concentration and the operating conditions of the engine 1 if necessary, and further, a fuel injection apparatus and the like of the engine 1 are operated to adjust the operating conditions of the engine 1.

The heat exchanger pipe 41 of the heat exchanging device 40 is curved to have a downward convex U-shape in a vertical direction, and surrounds the lower portion of the concentration detecting device 60 including the detecting section 61. Vertical portions of the heat exchanger pipe 41 are integrated with a vertical portion 131 (which corresponds to "a suction portion" in the present invention) of the supply pipe 13 and a vertical portion of the return pipe 14 by the welding or the like, and therefore, the heat exchange due to the heat-transfer is performed sufficiently between the respective vertical portions. Therefore, in the case where the temperature of the cooling water of the engine 1 flowing through the inside of the heat exchanging device 40 is higher than that of the urea water in the storage tank 20, the heat exchanging device 40 functions as a heating device for the urea water. On the other hand, if the temperature of the cooling water of the engine 1 is lower than that of the urea water, the heat exchanging device 40 functions as a cooling device for the urea water. Note, the welded portions of both vertical portions of the heat exchanger pipe 41 and the supply pipe 13 serve as "a heating medium" in the present invention.

In the storage tank 20, a temperature sensor 45 (FIG. 1) for detecting the temperature of the stored urea water is disposed. The functions of the heat exchanging device 40 as the heating device and the cooling device can be changed over, by controlling the first three-way valve 31, the second three-way valve 34 and the electromagnetic valve 33 by the control device 66 according to the detected temperature of the urea water. The temperature sensor 45 corresponds to "a second detecting device" in the present invention.

FIG. 2 shows a state where the urea water in the storage tank 20 is frozen.

In this state, the cooling water of the engine 1 is fed to the heat exchanger pipe 41 so that the heat exchanging device 40 functions as the heating device. Thereby, the lower portion of the concentration detecting device 60 including the detecting section 61, the inlet port 12 of the supply pipe 13 and a return port 15 of the return pipe 14 are heated. Therefore, even if the urea water in the vicinity of the wall surface of the storage tank 20 is frozen (shown as a frozen portion A) during the cold months, the urea water in the vicinity of the lower portion of the concentration detecting device 60 is not frozen or is defrosted after it is once frozen, so that the urea water maintains the liquid state. Thus, it becomes possible to stably detect the concentration of the urea water, and therefore, the reduction processing of NOx can be performed precisely according to the detected concentration of the urea water. Further, it is possible to suck the liquid state urea water from the storage tank 20 to inject it smoothly into the exhaust pipe 4 by the injection nozzle 11. In the present embodiment, since the cooling water of the engine 1 is adopted as the heat career obtained from the engine 1 and this cooling water is circulated to heat the urea water, the efficiency of the engine 1 as a heat engine can be sufficiently maintained. As the heat career obtained from the engine 1, the lubricating oil of the engine 1, the fuel in a fuel tank, the exhaust gas or the like may be adopted, other than the cooling water of the engine 1.

On the other hand, during the severe hot months, contrary to the above, since the storage tank 20 is subjected to the heating from the atmosphere, the road surface, the engine and the like, there is a possibility that the stored urea water rises to the high temperature, to generate the ammonia series gas. In this case, the first and second three-way valves 31 and 34 are changed over to open the second circulation passage 50, and also the pump 32 is operated, so that the cooling water of the engine 1 is heat radiated by the heat radiating device 51 to be cooled. Therefore, the heat exchange is performed between the cooling water in the heat exchanger pipe 41 and the high temperature urea water, so that the urea water is cooled. Consequently, the temperature of the urea water is appropriately maintained, so that the generation of ammonia series gas in the storage tank 20 can be prevented.

Figure 3:
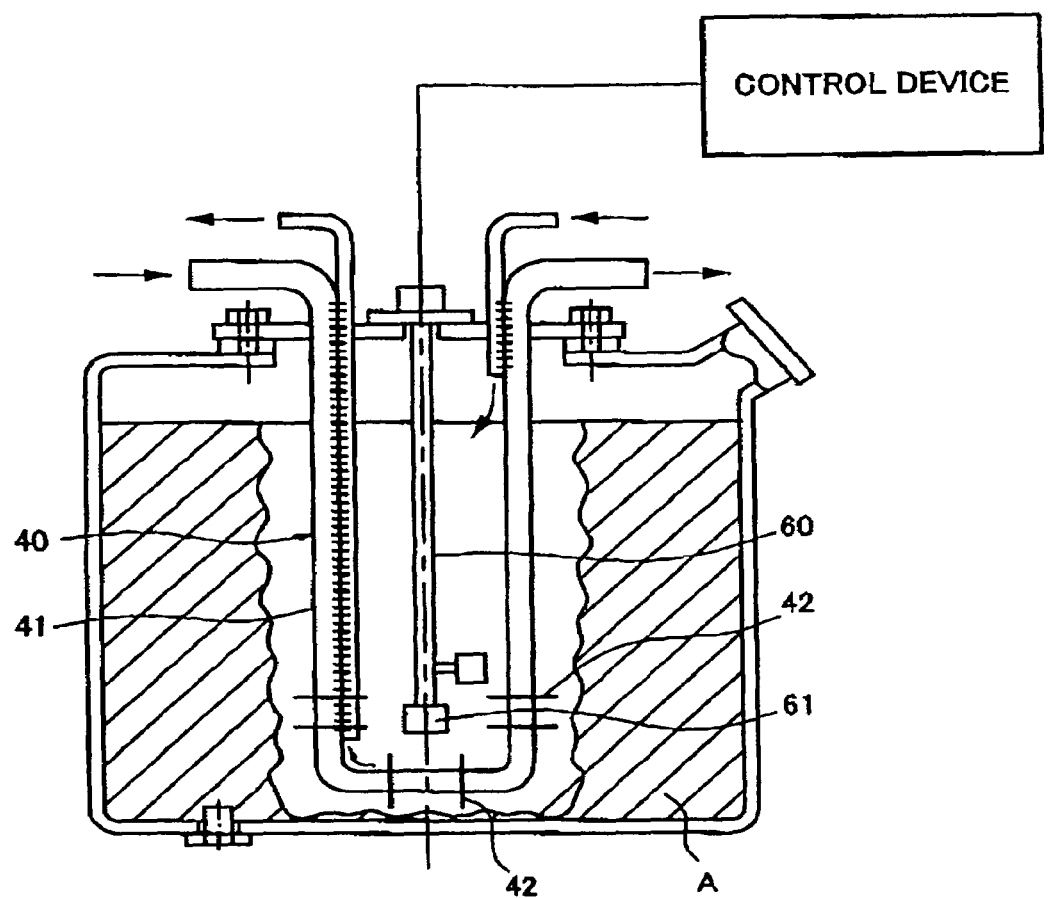
FIG. 3 is a diagram showing a heat exchanging device in which radiator fins are disposed to a heat exchanger pipe.

FIG. 3 shows a modified embodiment of the heat exchanging device 40 disposed in the storage tank 20.

Figure 4:
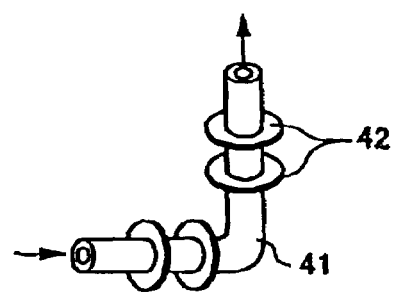
FIG. 4 is a diagram showing the heat exchanger pipe of the heat exchanging device shown in FIG. 3.

In this heat exchanging device 40, in order to enhance the heat exchange efficiency by this apparatus 40, heat radiating fins 42 (FIG. 4) as a first radiating device are disposed to the heat exchanger pipe 41. Further, as the first radiating device, the configuration may be such that, in place of or together with the disposed heat radiation fins 42, the convexo-concave is formed on the peripheral surface of the heat exchanger pipe 41 to make the cross section of the heat exchanger pipe 41 itself complex, thereby enlarging a contacting area between the heat exchanger pipe 41 and the urea water.

Figure 5:
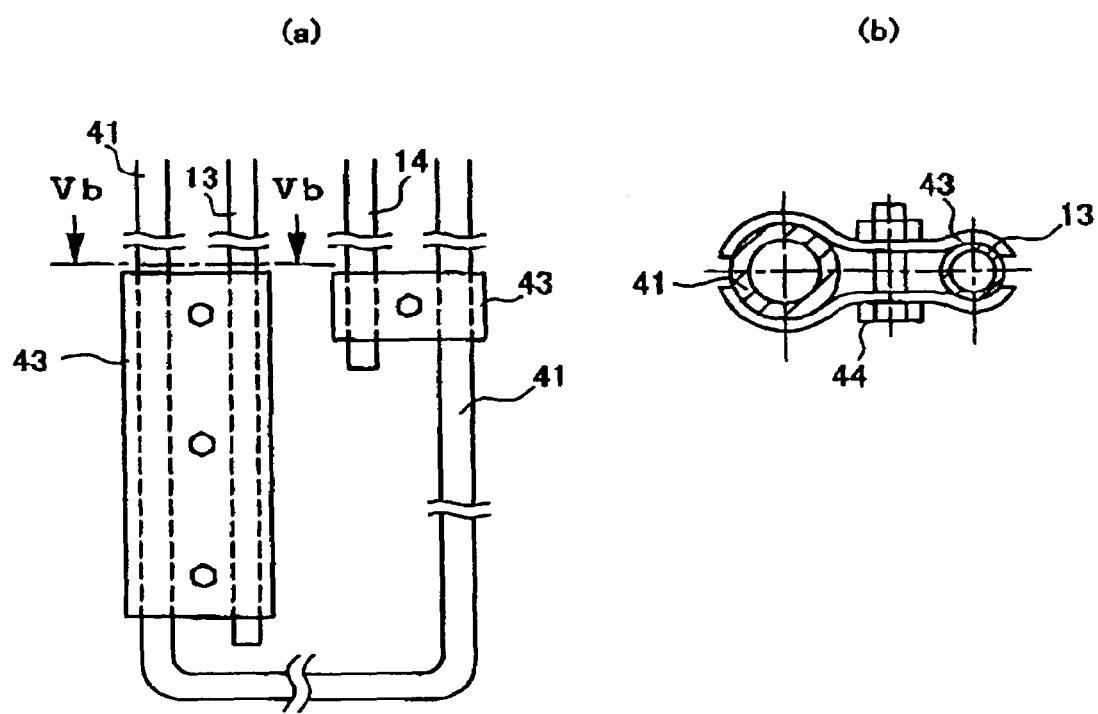
FIG. 5(a) is a diagram showing a modified embodiment of a thermally connecting structure between the heat exchanger pipe shown in FIG. 3, and a supply pipe and return pipe for a reducing agent.
FIG. 5(b) is a cross section along Vb-Vb line in FIG. 5(a).

Further, the connection of the supply pipe 13 and the return pipe 14 to the heat exchanger pipe 41 may be performed by combining a connecting fitting 43 and a bolt-nut 44 as shown in FIG. 5(*a*) and FIG. 5(*b*), other than the welding method. It is possible to heat the supply pipe 13 and the return pipe 14 indirectly due to the heat-transfer via the connecting fitting 43. The connecting fitting 43 corresponds to another "heating medium" in the present invention.

Figure 6:
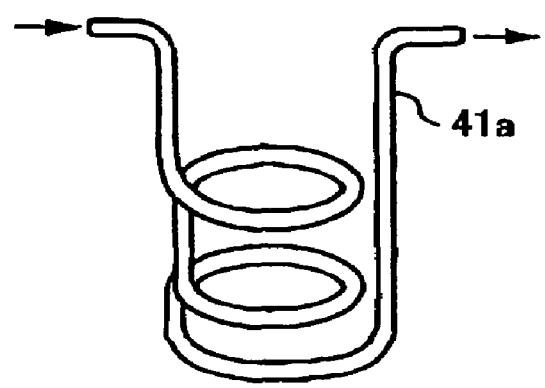
FIG. 6 is a diagram showing a modified embodiment of the heat exchanger pipe.
Figure 7:
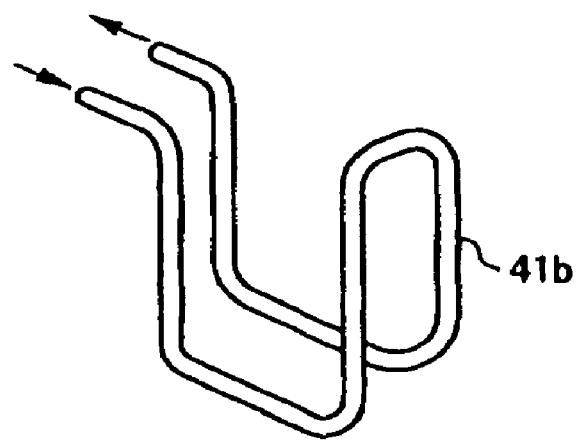
FIG. 7 is a diagram showing another modified embodiment of the heat exchanger pipe.

FIG. 6 and FIG. 7 respectively show further modified embodiments of the heat exchanging device 40.

In each of these heat exchanging devices 40, the shape of the heat exchanger pipe is modified to enlarge the contacting area between the heat exchanger pipe and the urea water. A heat exchanger pipe 41*a* shown in FIG. 6 is made up by forming one of the vertical portions of the U-shaped heat exchanger pipe 41 shown in FIG. 2 in a spiral shape, and is arranged around the concentration detecting device 60. A heat exchanger pipe 41*b* shown in FIG. 7 is made up by folding the U-shaped heat exchanger pipe 41 shown in FIG. 2 to form a parallel double U-shaped pipe. These heat exchanger pipes 41*a* and 41*b* each is formed for heating intensively the space between the bottom surface of the storage tank 20 and the detecting section 61 of the concentration detecting device 60, and the peripheral space of the detecting section 61. Therefore, it becomes possible to achieve the prevention of the urea water freezing in the vicinity of a bottom wall of the storage tank 20, at which the urea water is easily frozen, or the prompt defrost of the urea water at this portion.

Figure 8:
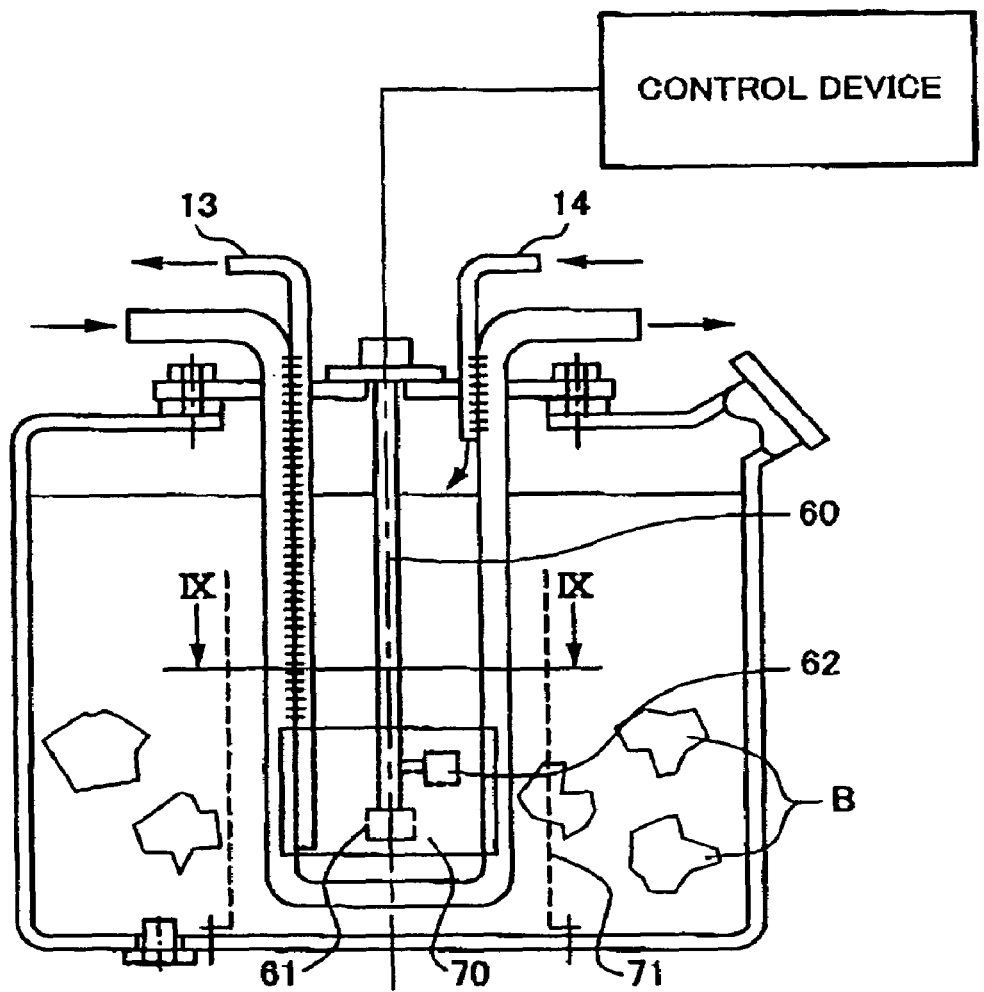
FIG. 8 is a diagram showing a reducing agent storage tank to which a protector is disposed.
Figure 9:
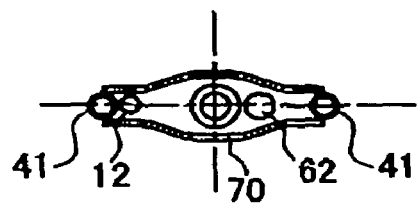
FIG. 9 is a cross section along IX-IX line in FIG. 8.

FIG. 8 and FIG. 9 respectively show further modified embodiments of the heat exchanging device.

In each of these heat exchanging devices 40, a protector 70 is disposed. The protector 70 is for protecting the detecting section 61 of the concentration detecting device 60 and a urea water residual warning switch 62 disposed above the detecting section 61. During the cold months where the temperature is lower than the freezing point of the urea water, if the engine 1 is left as it is after the operation stop, the urea water is partially frozen or is partially defrosted after frozen, so that a plurality of ice gorges B is generated. During the running of the vehicle, there is a possibility that the generated ice gorges B collides with the detecting section 61 and the residual warning switch 62, due to the vertical vibration, back and forth and around acceleration and the like of this vehicle, to break down or damage the detecting section 61 and the residual warning switch 62. The protector 70 prevents the collision of the ice gorges B, and also prevents the breakage or the like of the detecting section 61 and the residual warning switch 62. The protector 70 is configured such that two metallic slip members are laid over the heat exchanger pipe 41 to be detachably attached to the heat exchanger pipe 41.

The protector 70 may comprise plate type partitioning walls 71 (shown by dotted lines in FIG. 8) for laterally dividing the inside of the storage tank 20. This protector 70 is configured such that the two plate type members 71 rise in parallel with each other from the bottom wall of the storage tank 20 on opposite sides of the detecting section 61 and the residual warning switch 62. In the protector 70, a plurality of holes may be formed in the plate type members 71 or the plate type members 71 themselves may be formed in mesh texture. The ice gorges B are blocked by the protector 70, and thus, the crossing of the ice gorges B which pass between the two plate type members 71 is prevented.

Figure 10:
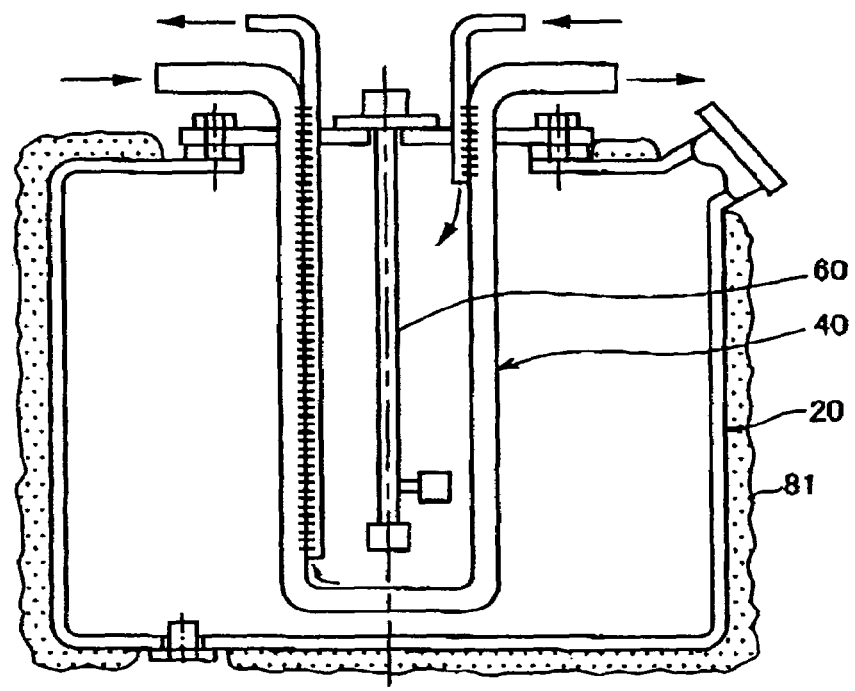
FIG. 10 is a diagram showing the reducing agent storage tank on which the thermal insulation processing is performed.
Figure 11:
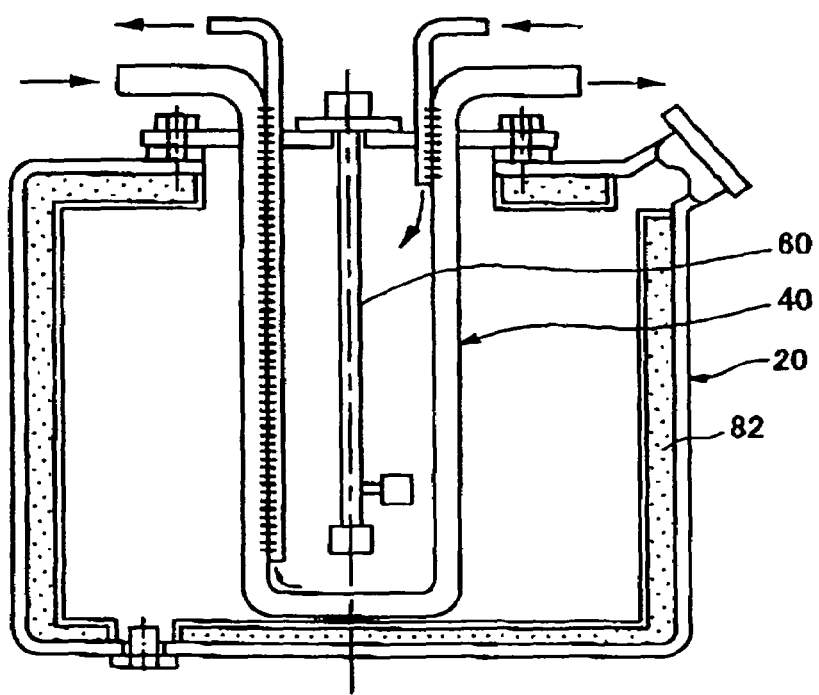
FIG. 11 is a diagram showing a modified embodiment of the reducing agent storage tank on which the thermal insulating processing is performed.

FIG. 10 and FIG. 11 show modified embodiments of the storage tank 20.

The storage tank 20 shown in FIG. 10 is sprayed with a foam heat insulating material 81 serving as a heat insulating material at an outer wall thereof, as the heat insulation processing, and the heat insulation of the inside of the storage tank 20 is achieved by the foam heat insulating material 81. Further, the storage tank 20 shown in FIG. 11 is structured to have double outer walls, as the other heat insulation processing, and a foam heat insulating material 82 is filled between these outer walls. The heat insulation of the inside of the storage tank 20 is achieved by the outer walls of the storage tank 20 including the foam heat insulating material 82. Both of the heat insulating materials 81 and 82 are effective as auxiliary materials for suppressing the cooling of the urea water during the cold months to avoid the freezing of the urea water. On the other hand, during the severe hot months, both of the heat insulating materials 81 and 82 are effective for suppressing the heat invasion from the outside to avoid the excessive temperature rise of the urea water.

Incidentally, the present invention can be applied to a gasoline engine.

In the foregoing description, only selected embodiments have been chosen to illustrate the present invention. However, the scope of the present invention is not limited by this description, but is to be interpreted based on the appended claims in accordance with to applied articles.

We claim:

1. An exhaust gas purifying apparatus in an engine, comprising:
    a reduction catalyst for accelerating the reduction of nitrogen oxide in an exhaust gas, the reduction catalyst being disposed in an exhaust passage of the engine;
    a storage tank for storing a reducing agent for the reduction of nitrogen oxide in the exhaust gas;
    a supply device configured to supply the reducing agent upstream of the reduction catalyst in the exhaust passage;
    a supply pipe inserted into the storage tank for leading the reducing agent in the storage tank to the supply device;
    a first detecting device configured to detect a concentration of the reducing agent in the storage tank, wherein the first detecting device comprises a detecting section disposed to soak in the reducing agent within the storage tank for generating an electric signal corresponding to the concentration of the reducing agent; and
    a heating device comprising a pipe member disposed inside the storage tank to partially form first piping for circulation of a heat carrier from the engine, wherein the heating device is configured to heat the reducing agent in the storage tank by circulating the heat carrier through the pipe member,
    wherein the pipe member includes a bent portion substantially formed in a U-shape, the bent portion surrounding the detecting section of the first detecting device to heat the reducing agent at least in the vicinity of the detecting section, and
    wherein the pipe member is connected via a heating medium to a suction portion of the supply pipe inside the storage tank.

2. The apparatus according to claim 1, wherein the heating device is configured to heat the reducing agent in the vicinity of an inlet port of the supply pipe.

3. The apparatus according to claim 2, wherein the heating device is configured to heat the suction portion of the supply pipe, which is positioned in the storage tank.

4. The apparatus according to claim 1, wherein the pipe member includes a first radiating device provided on a portion of the pipe member, which is positioned in the storage tank, to accelerate heat radiation from the pipe member.

5. The apparatus according to claim 1, further comprising:
    a protector disposed between the detecting section of the first detecting device and a wall surface of the storage tank, to protect the detecting section from colliding with solid matter.

6. The apparatus according to claim 5, wherein the protector surrounds the detecting section and an inlet port of the supply pipe.

7. The apparatus according to claim 1, wherein the storage tank includes a wall portion to which heat insulation processing is applied.

8. The apparatus according to claim 1, further comprising a cooling device configured to cool the reducing agent in the storage tank.

9. The apparatus according to claim 8, further comprising a control device configured to selectively activate the heating device and the cooling device.

10. The apparatus according to claim 9, wherein the cooling device comprises:
    second piping connected to the first piping at the upstream and downstream sides of the pipe member; and
    a second radiating device disposed on the second piping.

11. The apparatus according to claim 9, further comprising a second detecting device configured to detect a temperature of the reducing agent in the storage tank, wherein the control device selectively activates the heating device and the cooling device based on the temperature of the reducing agent detected by the second detecting device.

12. The apparatus according to claim 1, further comprising:
    a second detecting device configured to detect a temperature of the reducing agent in the storage tank; and
    a control device configured to operate the heating device based on the temperature of the reducing agent detected by the second detecting device.

13. An exhaust gas purifying apparatus in an engine, comprising:
    a reduction catalyst for accelerating the reduction of nitrogen oxide in an exhaust gas, the reduction catalyst being disposed in an exhaust passage of the engine;
    a storage tank for storing a reducing agent for the reduction of nitrogen oxide in the exhaust gas;
    a supply device configured to supply the reducing agent upstream of the reduction catalyst in the exhaust passage;
    a detecting device configured to detect a concentration of the reducing agent in the storage tank;
    a heating device configured to heat the reducing agent in the storage tank;
    a cooling device configured to cool the reducing agent in the storage tank; and
    a control device configured to selectively activate the heating device and the cooling device,
    wherein the heating device comprises a pipe member disposed inside the storage tank to partially form first piping that circulates a heat carrier obtained from the engine through the storage tank and the engine, and
    wherein the cooling device comprises:
        second piping connected to the first piping at the upstream and downstream sides of the pipe member, thereby bypassing the pipe member;
        a radiating device disposed on the second piping; and
        a passage switching valve disposed on a connecting portion of the first piping and the second piping operable to form a circulation passage for the heat carrier closed to the engine through the pipe member and the second piping in series,
    wherein the passage switching valve urges the heat carrier to circulate through the circulation passage so that the reducing agent in the storage tank is cooled by the heat carrier passing through the radiating device in the circulation passage.

* * * * *